United States Patent [19]

Fraser

[11] Patent Number: 4,544,643

[45] Date of Patent: Oct. 1, 1985

[54] REFRACTORY FUSED CHROME-ALUMINA BRICKS AND COMPOSITIONS MADE FROM A GRANULAR FUSED MATERIAL AND PROCESSES FOR THEIR PRODUCTION

[75] Inventor: Teresa M. Fraser, Murrysville, Pa.

[73] Assignee: Dresser Industries, Inc., Dallas, Tex.

[21] Appl. No.: 619,510

[22] Filed: Jun. 11, 1984

[51] Int. Cl.⁴ .................... C04B 35/10; C04B 35/12
[52] U.S. Cl. ................................ 501/127; 501/132
[58] Field of Search ............................. 501/127, 132

[56] References Cited

U.S. PATENT DOCUMENTS

| | | | |
|---|---|---|---|
| 2,279,260 | 4/1942 | Benner et al. | 501/127 |
| 3,192,058 | 6/1965 | Davies et al. | 501/127 |
| 3,585,058 | 6/1971 | Reardon | 501/127 |
| 3,862,845 | 1/1975 | Manigault | 501/127 |
| 3,888,687 | 6/1975 | Manigault | 501/127 |
| 3,948,670 | 4/1976 | Manigault | 501/127 |
| 4,126,654 | 11/1978 | Montgomery et al. | 501/132 |
| 4,158,569 | 6/1979 | Brothers et al. | 501/127 |
| 4,235,636 | 11/1980 | Friedrichs et al. | 501/132 |

FOREIGN PATENT DOCUMENTS

| | | | |
|---|---|---|---|
| 2758673 | 7/1979 | Fed. Rep. of Germany | 501/127 |
| 0072711 | 6/1977 | Japan | 501/127 |

*Primary Examiner*—Howard S. Williams
*Attorney, Agent, or Firm*—Barry E. Deutsch

[57] ABSTRACT

A refractory composition that is highly resistant to siliceous slag comprising from 45–85 weight percent chromic oxide and 15–55 weight percent alumina, said composition having a coarse grain fraction of −4 mesh and a fine grain fraction of −325 mesh comprising 40–100 weight percent chromic oxide.

6 Claims, No Drawings

REFRACTORY FUSED CHROME-ALUMINA BRICKS AND COMPOSITIONS MADE FROM A GRANULAR FUSED MATERIAL AND PROCESSES FOR THEIR PRODUCTION

BACKGROUND OF THE INVENTION

The present invention relates to refractory chrome-alumina bricks and compositions made from a granular fused material and processes for their production. As used herein, the term "fused material" refers to a product which is obtained by heating a starting material to its molten state, pouring the molten material into a vessel or mold, then letting the material solidify in the vessel or mold.

The utilization of alumina and chromic oxide to manufacture refractory bricks has previously been known. For example, in U.S. Pat. No. 3,192,058, there is taught the addition of 1 to 15% fine chromic oxide to sintered alumina and other oxides. This mixture is then formed into brick and burned to form a ceramic bond. U.S. Pat. Nos. 3,862,845; 3,888,687; and 3,948,670 suggest the addition of 1 to 25% chromic oxide in combination with other oxides and bonds to tabular or sintered alumina. The mixes thus formed are either pressed into brick and burned or used as plastics or ramming mixes.

It is also known to manufacture fused chrome-alumina refractories. These refractories are made primarily from the fusion of chromite and alumina, and are composed of two phases, chrome-alumina solid solution and a spinel formed from MgO, and FeO, with $Cr_2O_3$ and $Al_2O_3$. In U.S. Pat. No. 2,279,260 it is taught that the spinel formation may be limited by adding acid oxides or restricting the basic oxide content of the composition. In U.S. Pat. No. 4,158,569 there is disclosed a dense fused cast product and fused grain product composed of a chrome alumina solid solution and at least, a 5 volume percent oxide secondary crystal phase mainly comprising chrome-containing alkaline earth metal hexa aluminate solid solution and less than 10 volume percent metal phase. The composition thus described is used to reduce the rate of molten glass corrosion and to increase electrical resistivity.

One major application for compositions made from chrome and alumina is apparatus used in coal gasification processes. When coal is combusted to produce gas, siliceous slags are produced. Most refractory materials are susceptible to corrosion by siliceous slags. Prior art patents have suggested that, as the percentage of chromic oxide in a brick increases, its resistance to corrosion by a highly siliceous slag would likewise increase.

Accordingly, it is an object of the present invention to provide a refractory made solely from chrome and alumina, plus minor impurities, that has high resistance to siliceous slags, particularly of the type formed in coal gasification processes. The refractory, in addition to its siliceous slag resistance, should likewise have high strength up to 3300° F. and good resistance to thermal shock as measured by the standard prism spalling test.

SUMMARY OF THE INVENTION

The objects of the invention are attained in a rebonded brick made from a size graded batch of fused alumina, or fused chrome-alumina solid solution, with the brick being composed of two parts, a coarse fraction sized less than $-4$ mesh and a fine fraction, referred to as the matrix, sized $-325$ mesh. The matrix will always have an equal or greater percentage of chromic oxide than the coarse fraction, and the percentage of chromic oxide in the matrix will vary in the range from 40–100 weight percent.

DESCRIPTION OF THE PREFERRED EMBODIMENT

A refractory is basically composed of two parts; (1) a coarse fraction sized $-4$ mesh; and (2) a fine fraction comprised of ball milled fines of $-325$ mesh. The coarse fraction gives the refractory stability. The fine fraction is often referred to as a matrix, and it is the fine fraction that binds the brick. When brick are made from fused grain, the coarse particles are very dense, with low porosity, and are resistant to attack by corrosive slag. The matrix, on the other hand, is relatively porous and is relatively fine with a large surface area vulnerable to attack by siliceous slags that penetrate the pore structure of the brick. Therefore, the most slag resistant part of the brick should be the matrix.

As noted previously, it has been suggested that as the percentage of chromic oxide in a brick increases, its resistance to corrosion by a highly siliceous slag would likewise increase. To test this theory, three fused chrome-alumina solid solutions were made of increasing chromic oxide content. Typical chemical analyses of the raw materials used to prepare the fused grain are shown in Table I.

TABLE I

| Chemical Analysis | Kraft $Cr_2O_3$ | Alcoa A-2 Alumina |
| --- | --- | --- |
| Silica ($SiO_2$) | <0.01 | 0.1 |
| Alumina ($Al_2O_3$) | 0.06 | 99.4 |
| Titania ($TiO_2$) | <0.01 | 0.03 |
| Iron Oxide ($Fe_2O_3$) | 0.08 | 0.06 |
| Chromic Oxide ($Cr_2O_3$) | 99.81 | 0.06 |
| Lime (CaO) | <0.01 | 0.06 |
| Magnesia (MgO) | 0.02 | 0.02 |
| Total Alkalies | 0.03 | 0.39 |
| Loss on Ignition (2000° F.) | 0.4 | 0.4 |

(Note: < = Less than).

Using the chromic oxide and alumina shown in Table I, three chromic oxide alumina compositions of increased chromic oxide content were fused in an electric furnace. The composition of these three fused chrome-alumina solid solutions are shown in Table II and have a chromic oxide content of Type A, 24.2%, Type B, 49.4% and Type C, 71.1%.

TABLE II

| Chemical Analysis of Fused Chrome Alumina Grain | | | |
| --- | --- | --- | --- |
| Grain Description: | A | B | C |
| Chemical Analysis (Calcined Basis) | | | |
| Silica ($SiO_2$) | 0.29% | 0.12% | 0.16% |
| Alumina ($Al_2O_3$) | 75.0 | 50.0 | 28.2 |
| Titania ($TiO_2$) | 0.04 | 0.08 | 0.12 |
| Iron Oxide ($Fe_2O_3$) | 0.07 | 0.06 | 0.06 |
| Chromic Oxide ($Cr_2O_3$) | 24.2 | 49.4 | 71.1 |
| Lime (CaO) | 0.15 | 0.2 | 0.22 |
| Magnesia (MgO) | 0.04 | 0.05 | 0.06 |
| Soda ($Na_2O$) | 0.21 | 0.12 | 0.08 |
| Potash ($K_2O$) | <0.01 | <0.01 | <0.01 |
| Lithia ($Li_2O$) | 0.01 | 0.01 | <0.01 |
| Total Analyzed | 100.00% | 100.00% | 100.00% |
| Loss on Ignition (2000° F.): | +0.73% | +1.04% | +0.94% |

Brick were made from a size graded batch of each of these three fused grains. Brick were made using standard techniques by mixing about 4% bonding agent with the batches to provide a formable mix, then pressing the brick under 18,000 psi. The brick were then dried and burned to 2900° F. with a five hour hold.

Test results on these brick are shown in Table III.

TABLE III

| Mix Number: | 1 | 2 | 3 |
|---|---|---|---|
| % $Cr_2O_3$ in Mix: | 24.2 | 49.4 | 71.1 |
| Grain A | 100.0% | | |
| Grain B | | 100.0% | |
| Grain C | | | 100.0% |
| Bulk Density, pcf: | 213 | 227 | 242 |
| Modulus of Rupture, psi | | | |
| At Room Temperature: | 3460 | 4700 | 4600 |
| At 2700° F. | 720 | 2630 | 840 |
| Apparent Porosity, %: | 18.3 | 18.3 | 17.9 |
| Drip Slag Test at 2900° F. Reducing Conditions 1200 Grams of Coal Ash Slag Volume of Erosion in cu cm: | 60 | 8 | Trace |

All tests were performed by ASTM methods. The Drip Slag Test is described under ASTM C-768-79 - Standard Method of Drip Slag Testing Refractory Brick at High Temperatures.

In the slag test, there is an obvious decrease in erosion as the percentage of chromic oxide in the brick increases in Mixes 1,2 and 3.

In a second series of tests, an attempt was made to establish the principal that a concentration of chromic oxide in the matrix is more important in reducing slag erosion than the total amount of chromic oxide in the brick.

Brick shown in Table IV were made in the same manner as previously described for brick illustrated in Table III. In this test, Grains A, B and C were used except 10% of the ball milled fines that would be part of the matrix were replaced with 10% chromic oxide. Test results on these brick are shown in Table IV.

TABLE IV

| Mix Number: | 4 | 5 | 6 |
|---|---|---|---|
| % $Cr_2O_3$ in Mix: | 31.8 | 54.5 | 74 |
| Grain A | 90.0% | | |
| Grain B | | 90.0% | |
| Grain C | | | 90.0% |
| Chromic Oxide-Matrix | 10 | 10 | 10 |
| Bulk Density, pcf: | 220 | 237 | 246 |
| Modulus of Rupture, psi | | | |
| At Room Temperature | 5440 | 5520 | 3950 |
| At 2700° F.: | 3840 | 920 | 1430 |
| Apparent Porosity, %: | 16.1 | 15.8 | 17.3 |
| Drip Slag at 2900° F., Reducing 1200 Grams of Coal Ash Slag Volume of Erosion cu cm: | Trace | Trace | Trace |

Comparing Mixes 1 and 2 of Table III with Mixes 4 and 5 of Table IV shows the addition of chromic oxide to the matrix made a sharp reduction in the amount of erosion in the drip slag test. Some reduction would be expected because Mixes 4 and 5 have a higher percentage of $Cr_2O_3$ in the brick than Mixes 1 and 2 respectively. However, a comparison of the volume erosion in Mixes 2 and 4 clearly shows a concentration of $Cr_2O_3$ in the matrix is more important than the total amount of $Cr_2O_3$ in the brick. Mix 4, with a total $Cr_2O_3$ in the brick of 31.8%, but a higher concentration of chromic oxide in the matrix showed only a trace of erosion while Mix 2 with 49.4% chromic oxide in the brick showed 8 cu cm of erosion. Since the test was conducted by only dripping 1200 grams of slag on the test brick, the test merely acted as an indicator that the hypothesis regarding placement of $Cr_2O_3$ in the matrix might be valid. Additional testing with much greater quantities of slag would be necessary to confirm the validity of the hypothesis.

Petrographic examination of polished sections of Mixes 1, 2 and 3 were made.

The examination of sample 1 after slag testing with a Si-Fe-Al-Ca rich coal ash slag showed significant reaction and resultant expansion across the sample surface. Penetration was evident throughout the sample. Electron microprobe analysis indicated that the slag had reacted with the fused chromic oxide alumina coarse fractions and matrix to form an expansive Fe-Al-Cr rich spinel phase in an Al-Si-Ca-Fe-Cr glass. With increased total chromic oxide content within the fused grain, less reaction was noted. Sample 2 exhibited only minor reaction and trace expansion across the slagged face. Penetration was evident only to approximately the 1 inch depth beneath the slagged surface. Sample 3 exhibited no significant penetration or alteration.

Examination of samples from Table IV showed only minor penetration and reaction. The closed, discontinuous pore structure, the presence of chromic oxide filling the porosity, and the chromic oxide rich rims around the exterior of the fused grain, particularly the 25% and 50% chromic oxide bearing fused grains, sealed the compositions from reaction. Sample 4 exhibited reaction only to approximately the ¼" depth beneath the slagged face. A thin (less than 1/10 inch) siliceous glaze with trace Cr-Al-Fe spinels were evident in samples 5 and 6.

A typical chemical analysis of the coal ash slag used in these drip slag tests is shown in Table V.

TABLE V

| Chemical Analysis | Coal Ash Slag |
|---|---|
| Silica ($SiO_2$) | 47.2% |
| Alumina ($Al_2O_3$) | 19.01 |
| Titania ($TiO_2$) | 0.05 |
| Iron Oxide ($Fe_2O_3$) | 22.4 |
| Lime (CaO) | 6.81 |
| Magnesia (MgO) | 1.72 |
| Manganese Oxide (MnO) | 0.17 |

The drip slag test measured on brick in Table III clearly showed that the amount of chromic oxide had a marked effect on slag erosion. The results in Table IV indicate that placement of increased amounts of chromic oxide in the matrix had even a larger desirable effect on resistance to slag erosion.

A third series of brick was made to study a wide range of chrome-alumina compositions varying from 0 to about 75% $Cr_2O_3$ in the coarse fraction and 50 to substantially 100% $Cr_2O_3$ in the matrix. The brick were made in the same manner as those brick described in Tables III and IV except the forming pressure was reduced to 13,500 psi to avoid any pressure cracking. The composition of the fused grains and the chromic oxide used in these brick are shown in Table VI.

TABLE VI

| Grain Description | D | E | F | G | H |
|---|---|---|---|---|---|
| Chemical Analysis | | | | | |
| Silica ($SiO_2$) | 0.73% | 0.26% | 0.20% | 0.27% | 0.11% |
| Alumina ($Al_2O_3$) | 96.3 | 66.1 | 57.1 | 48.1 | 24.8 |
| Titania ($TiO_2$) | 2.4 | 0.02 | 0.01 | 0.01 | <0.01 |
| Iron Oxide ($Fe_2O_3$) | 0.16 | 0.20 | 0.09 | 0.12 | 0.09 |
| Chromic Oxide | — | 32.8 | 41.4 | 50.7 | 74.2 |
| Lime (CaO) | 0.16 | 0.03 | 0.04 | 0.04 | 0.05 |
| Magnesia (MgO) | 0.16 | 0.03 | 0.03 | 0.11 | 0.03 |

TABLE VI-continued

| Grain Description | D | E | F | G | H |
|---|---|---|---|---|---|
| Total Alkalies | 0.35 | — | — | — | — |

The grains in Table VI were used to make brick of the compositions shown in Table VII. The chemical analysis of the chromic oxide used is identical to that shown in Table I.

TABLE VII

| Mix Designation: | 7 | 8 | 9 | 10 | 11 | 12 |
|---|---|---|---|---|---|---|
| Mix: | | | | | | |
| Grain D −4 mesh | 70.0% | | | | | |
| Grain E −4 mesh Ball Milled Fines | | | 71.5% | 55.0% | 52.5% | |
| Grain F −4 mesh Ball Milled Fines | | | | | | 10 |
| Grain G −4 mesh | | 71.0% | | | | |
| Ball Milled Fines | | 29 | | | | |
| Grain H −4 mesh | | | | 15 | 8 | 71.1 |
| Ball Milled Fines | | | | 30 | 19.5 | 8.9 |
| Chromic Oxide | 30 | | 28.5 | | 10 | 20 |
| Pressed Density, pcf: | 231 | 240 | 242 | 238 | 247 | 269 |
| Fired Density, pcf: | 221 | 232 | 233 | 230 | 238 | 261 |
| Modulus of Rupture, | | | | | | |
| psi at 70° F.: | 4470 | 3250 | 3390 | 2420 | 3800 | 3250 |
| at 2700° F.: | 2670 | 1270 | 3270 | 1060 | 2800 | 2670 |
| Apparent Porosity, %: | 14.8 | 18.1 | 16.9 | 18.7 | 15.3 | 14.9 |
| Apparent Specific Gravity: | 4.12 | 4.47 | 4.45 | 4.46 | 4.45 | 4.84 |
| Load Test at 3300° F. 90 Minute Hold % Subsidence: | +0.4 | 0.2 | +0.2 | +0.1 | +0.4 | +0.4 |
| Modulus of Elasticity ($\times 10^6$): | 19.4 | 15.5 | 17.6 | 14.2 | 19.6 | 18.7 |
| Prism Spall Test (Av 3) 2200° to Air | | | | | | |
| Cycles to Failure: | 25 | 30+ | 26 | 28 | 28 | 27 |
| Range: | 15–30+ | — | 18–30+ | 25–30+ | 24–30+ | 22–30+ |
| Drip Slag Test at 2900° F. Reducing Conditions Using 2400 Grams Coal Ash Slag Volume Eroded, cu cm: | 15 | 30 | — | — | — | |
| Using 4800 Grams Coal Ash Slag Volume Eroded cu cm: | — | — | 6.5 | 10 | 5 | 2.4 |
| Chemical Analysis (Calcined Basis) | | | | | | |
| Silica ($SiO_2$) | 0.44% | 0.14% | 0.23% | 0.26% | 0.38% | 0.13% |
| Alumina ($Al_2O_3$) | 69.3 | 48.1 | 50.4 | 51.0 | 50.5 | 20.3 |
| Titania ($TiO_2$) | 1.81 | 0.03 | 0.03 | 0.04 | 0.04 | 0.01 |
| Iron Oxide ($Fe_2O_3$) 0.36 | 0.36 | 0.41 | 0.17 | 0.33 | 0.28 | 0.18 |
| Chromic Oxide ($Cr_2O_3$) | 27.3 | 50.5 | 48.4 | 47.7 | 48.5 | 78.7 |
| Lime (CaO) | 0.24 | 0.17 | 0.14 | 0.16 | 0.16 | 0.15 |
| Magnesia (MgO) | 0.11 | 0.08 | 0.09 | 0.09 | 0.10 | 0.08 |
| Total Analyzed | 99.56% | 99.43% | 99.46% | 99.58% | 99.46% | 99.55% |

This set of six brick was made with the intent to further show the importance of the placement and amount of chromic oxide in the brick on resistance to siliceous coal ash slag. Mix 7 contains only 30% chromic oxide, but it was placed all in the matrix, with the coarser fractions being fused bauxite. Mixes 8, 9, 10 and 11 all contained about 50% chromic oxide, but the chromic oxide was placed in the various screen fractions and in different forms. Mix 8 was made only from grain G that contained about 50% chromic oxide. The coarse fraction of Mix 9 was composed of grain E, which contained about 30% chromic oxide, while the fine fraction was composed solely of chromic oxide. The coarse fraction in Mix 10 was made with a combination of grain E and H, while the fines were composed of grain H, which contained about 73% chromic oxide. Mix 11 was similar to Mix 10, but in addition contained 10% chromic oxide in the fines. Mix 12 was made from a combination of 80% grain H primarily in the coarse fraction and 20% fine chromic oxide. This mix contained the highest percentage of chromic oxide.

Each of the five refractory aggregates D to H plus the chromic oxide were carefully mixed to obtain the approximate screen analyses listed below:

| | Percent (Volume) |
|---|---|
| −8 + 10 mesh | 22 |
| −10 + 28 mesh | 25 |
| −28 + 65 mesh | 14 |
| −65 + 325 mesh | 10 |
| −325 mesh | 29 |

All mesh sizes referred to herein are made with reference to Tyler Screen Standards.

All six brick had excellent modulus of rupture at room temperature and 2700° F., outstanding load bearing strength at 3300° F., and good resistance to thermal shock in the prism spalling test.

The Drip Slag test at 2900° F. under reducing conditions using coal ash slag is the most important result in this series of tests as the corrosive effect of this slag is the major cause of wear in a coal gasification unit. Mix 8, made solely from a fused grain containing a 50-50 mixture of alumina and chromic oxide, showed 30 cu cm of erosion after being dripped with 2400 grams coal gasification slag. In comparison, Mixes 9, 10 and 11, each one also containing a total of about 50% chromic oxide, but a much higher percentage thereof in the matrix, had only 6.5, 10 and 5 cu cm respectively of erosion even though dripped with twice as much coal ash slag, 4800 grams.

Mix 12 which contained the highest percentage of chromic oxide and also a high percentage of chromic oxide in the matrix, had the least erosion of only 2.4 cu cm. This clearly demonstrated that both amount and placement of the chromic oxide in an alumina-chrome refractory are the essential features to give the refractory high resistance to erosion by siliceous coal ash slag. In summary, from reviewing the data obtained from the tests, it can be concluded that a brick formed from a chrome-alumina mix having a total chromic oxide content of 45-85 by weight percent, with 40-100 by weight percent chromic oxide content in the matrix will have high resistance to erosion by siliceous slag.

While a preferred embodiment of the present invention has been described and illustrated, the invention should not be limited thereto but may be otherwise embodied within the scope of the following claims.

The embodiments of the invention in which an exclusive property or privilege is claimed are defined as follows:

1. A refractory composition consisting of from 45 through 85 weight percent chromic oxide, and 15 through 55 weight percent alumina, said composition consisting of a fused coarse grain fraction of −4 mesh and a fine grain fraction of −325 mesh forming a bonding matrix, said fine grain fraction comprising 40 through 100 weight percent chromic oxide.

2. A refracrtory composition in accordance with claim 1 wherein said fused coarse grain fraction comprises 70 through 75 volume percent and said fine grain fraction comprises 25 through 30 volume percent.

3. A method of manufacturing a refractory brick having high resistance to siliceous slag comprising the steps of:
providing a size graded batch having a coarse grain fraction of −4 mesh comprising 70 through 75 volume percent and a fine grain fraction of −325 mesh comprising 25 through 30 volume percent, said fine grain fraction comprising 40 through 100 weight percent chromic oxide, said batch consisting of from 45 through 85 weight percent chromic oxide and 15 through 55 weight percent alumina;
mixing a bonding agent with the batch to obtain a formable mix;
pressing the mix to form a brick-like shape; and
drying and burning the shape to form said brick.

4. In a method for increasing the siliceous slag resistance of a chrome-alumina composition wherein the improvement comprises the steps of:
providing a size graded batch of fused chrome and alumina including a −4 mesh coarse grain fraction and a −325 mesh fine-grain fraction; and
adding sufficient quantities of fine grain chromic oxide to said fine grain fraction such that 40 through 100 weight percent of said grain fraction consists of chromic oxide.

5. A siliceous slag resistant brick consisting of 45 through 85 weight percent chromic oxide; and 15 through 55 weight percent alumina, said brick including a −4 mesh fused coarse grain fraction and a −325 mesh fine grain fraction, said fine grain fraction comprising 40 through 100 by weight percent chromic oxide.

6. A siliceous slag resistant brick in accordance with claim 5, wherein said fused coarse grain fraction comprises 70 through 75 volume percent and said fine grain fraction comprises 25 through 30 volume percent.

* * * * *

UNITED STATES PATENT AND TRADEMARK OFFICE
CERTIFICATE OF CORRECTION

PATENT NO. : 4,544,643

DATED : October 1, 1985

INVENTOR(S) : Teresa M. Fraser and David V. Stiles

It is certified that error appears in the above—identified patent and that said Letters Patent is hereby corrected as shown below:

Title page:

Title page, Item [19] should read --Fraser et al--
Item [75] add --David V. Stiles, Pittsburgh, Pa.-- as a co-inventor.

Signed and Sealed this

Eighth Day of April 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,544,643

DATED : October 1, 1985

INVENTOR(S) : Teresa M. Fraser and David V. Stiles

It is certified that error appears in the above-identified patent and that said Letters Patent are hereby corrected as shown below:

IN THE CLAIMS:
  Claim 3, column 8, line 10, before "coarse" insert --fused--.

Signed and Sealed this

Twelfth Day of July, 1988

Attest:

DONALD J. QUIGG

Attesting Officer

Commissioner of Patents and Trademarks